United States Patent
Vasseur et al.

(10) Patent No.: US 11,477,112 B2
(45) Date of Patent: Oct. 18, 2022

(54) ON-THE-FLY SD-WAN TUNNEL CREATION FOR APPLICATION-DRIVEN ROUTING

(71) Applicant: Cisco Technology, Inc., San Jose, CA (US)

(72) Inventors: Jean-Philippe Vasseur, Saint Martin d'Uriage (FR); Grégory Mermoud, Venthône (CH); Vinay Kumar Kolar, San Jose, CA (US); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/196,128

(22) Filed: Mar. 9, 2021

(65) Prior Publication Data

US 2022/0294725 A1 Sep. 15, 2022

(51) Int. Cl.
| | |
|---|---|
| *H04L 45/02* | (2022.01) |
| *H04L 45/42* | (2022.01) |
| *H04L 43/16* | (2022.01) |
| *H04L 45/302* | (2022.01) |
| *H04L 12/46* | (2006.01) |
| *H04L 45/12* | (2022.01) |

(52) U.S. Cl.
CPC .......... *H04L 45/04* (2013.01); *H04L 12/4633* (2013.01); *H04L 43/16* (2013.01); *H04L 45/123* (2013.01); *H04L 45/302* (2013.01); *H04L 45/42* (2013.01)

(58) Field of Classification Search
CPC ..... H04L 45/04; H04L 12/4633; H04L 43/16; H04L 45/123; H04L 45/302; H04L 45/42
See application file for complete search history.

(56) References Cited

U.S. PATENT DOCUMENTS

| | | | |
|---|---|---|---|
| 2005/0163079 A1* | 7/2005 | Taniuchi | H04W 12/069 370/331 |
| 2009/0310614 A1* | 12/2009 | Krishnamurthy | H04L 47/825 370/401 |
| 2015/0334088 A1* | 11/2015 | Luo | H04L 12/4633 726/15 |
| 2016/0218971 A1* | 7/2016 | Basunov | H04L 45/70 |
| 2017/0012870 A1 | 1/2017 | Blair et al. | |
| 2017/0244607 A1* | 8/2017 | Dujodwala | H04L 12/42 |

(Continued)

*Primary Examiner* — Mohamed A. Wasel
*Assistant Examiner* — Jihad K Boustany
(74) *Attorney, Agent, or Firm* — Behmke Innovation Group LLC; Kenneth J. Heywood; Jonathon P. Western

(57) ABSTRACT

In one embodiment, a controller obtains data indicative of an application experience metric for an online application having application traffic conveyed via the network. The controller predicts the application experience metric that would result from a first edge router conveying its application traffic to the online application via a second edge router that is not currently connected to the first edge router via a tunnel, based on the obtained data. The controller makes a determination that the first edge router should route its application traffic to the online application via a tunnel between the first edge router and the second edge router, based on the predicted application experience metric. The controller causes a tunnel to be established in the network between the first edge router and the second edge router, whereby the first edge router routes its application traffic to the online application via the second edge router.

20 Claims, 10 Drawing Sheets

(56) References Cited

U.S. PATENT DOCUMENTS

| | | |
|---|---|---|
| 2019/0268973 A1* | 8/2019 | Bull .................... H04L 12/4641 |
| 2019/0280963 A1 | 9/2019 | Michael et al. |
| 2020/0252234 A1* | 8/2020 | Ramamoorthi ......... H04L 45/64 |
| 2020/0313980 A1 | 10/2020 | Chandrasekhar et al. |
| 2020/0382402 A1 | 12/2020 | Kolar et al. |
| 2021/0382725 A1* | 12/2021 | Vemula .................. G06N 20/00 |

* cited by examiner

ON-THE-FLY SD-WAN TUNNEL CREATION FOR APPLICATION-DRIVEN ROUTING

TECHNICAL FIELD

The present disclosure relates generally to computer networks, and, more particularly, to on-the-fly software-defined wide area network (SD-WAN) tunnel creation for application-driven routing.

BACKGROUND

Applications are increasingly adopting the software-as-a-service (SaaS) model in which the application is hosted centrally, such as in the cloud. In such deployments, various SaaS endpoints are distributed across different geographic regions, to afford better performance to the clients of the application. For instance, one datacenter for the SaaS application may be located in Asia, while another may be located in Europe.

How traffic is routed to an SaaS or other online application is typically a function of the chosen network topology. For instance, SD-WANs may employ hub & spoke topologies, full-mesh topologies, or even per-region, full-mesh topologies. As would be appreciated, each of these and other types of topologies offers both pros and cons, often trading off routing optimality versus complexity/scale. In addition, determining the best 'exit' to the Internet is particularly challenging. Both of these factors, however, can have a significant impact on the application performance experienced by the users of the application.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
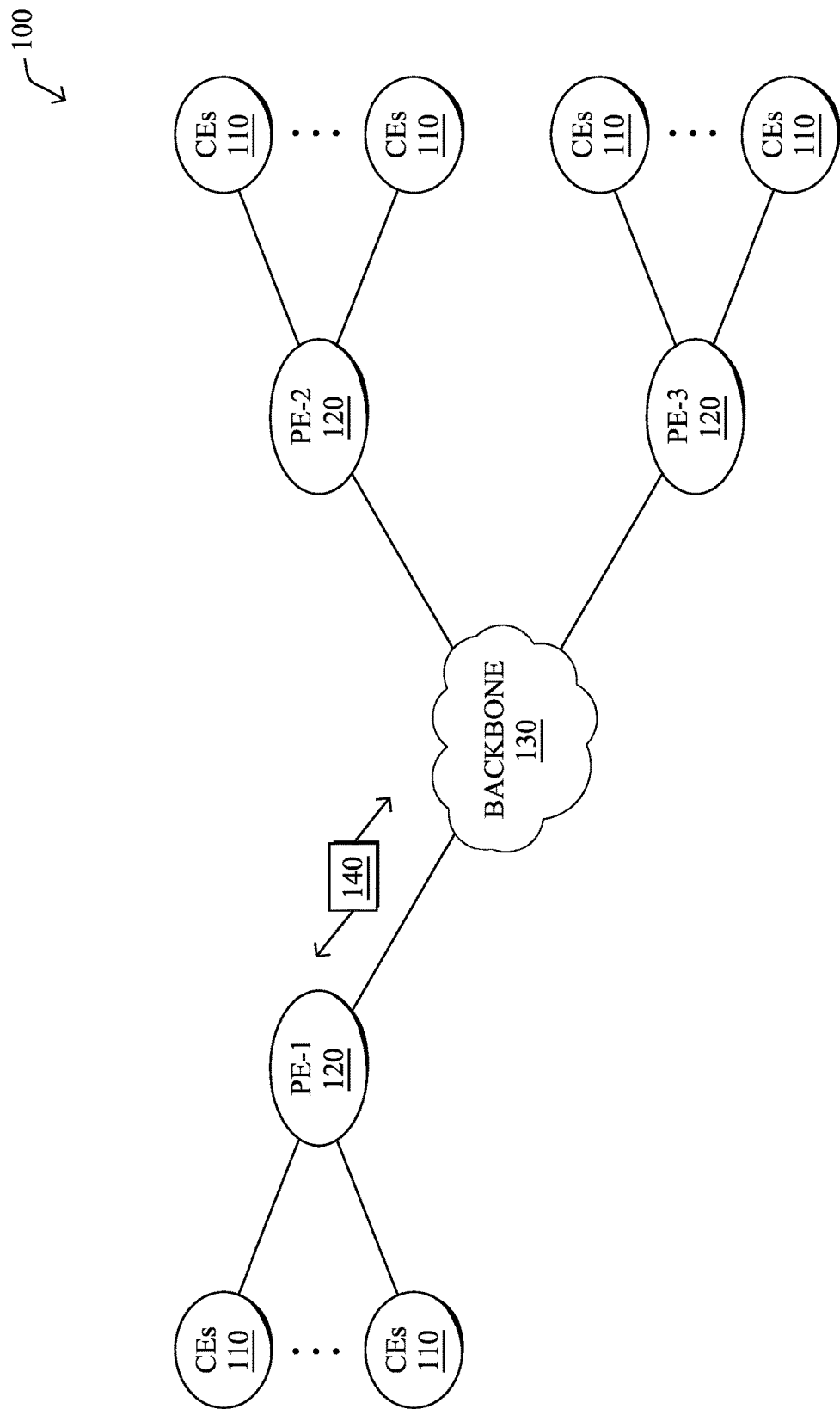
FIGS. 1A-1B illustrate an example communication network.

According to one or more embodiments of the disclosure, a controller for a network comprising a plurality of edge routers obtains data indicative of an application experience metric for an online application having application traffic conveyed via the network. Each edge router is connected to at least one other edge router in the plurality of edge routers via a tunnel. The controller predicts, for a first edge router in the plurality of edge routers, the application experience metric that would result from the first edge router conveying its application traffic to the online application via a second edge router in the plurality of edge routers that is not currently connected to the first edge router via a tunnel, based on the data indicative of the application experience metric obtained by the controller. The controller makes a determination that the first edge router should route its application traffic to the online application via a tunnel between the first edge router and the second edge router, based on the application experience metric predicted by the controller. The controller causes, based on the determination, a tunnel to be established in the network between the first edge router and the second edge router, whereby the first edge router routes its application traffic to the online application via the second edge router.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
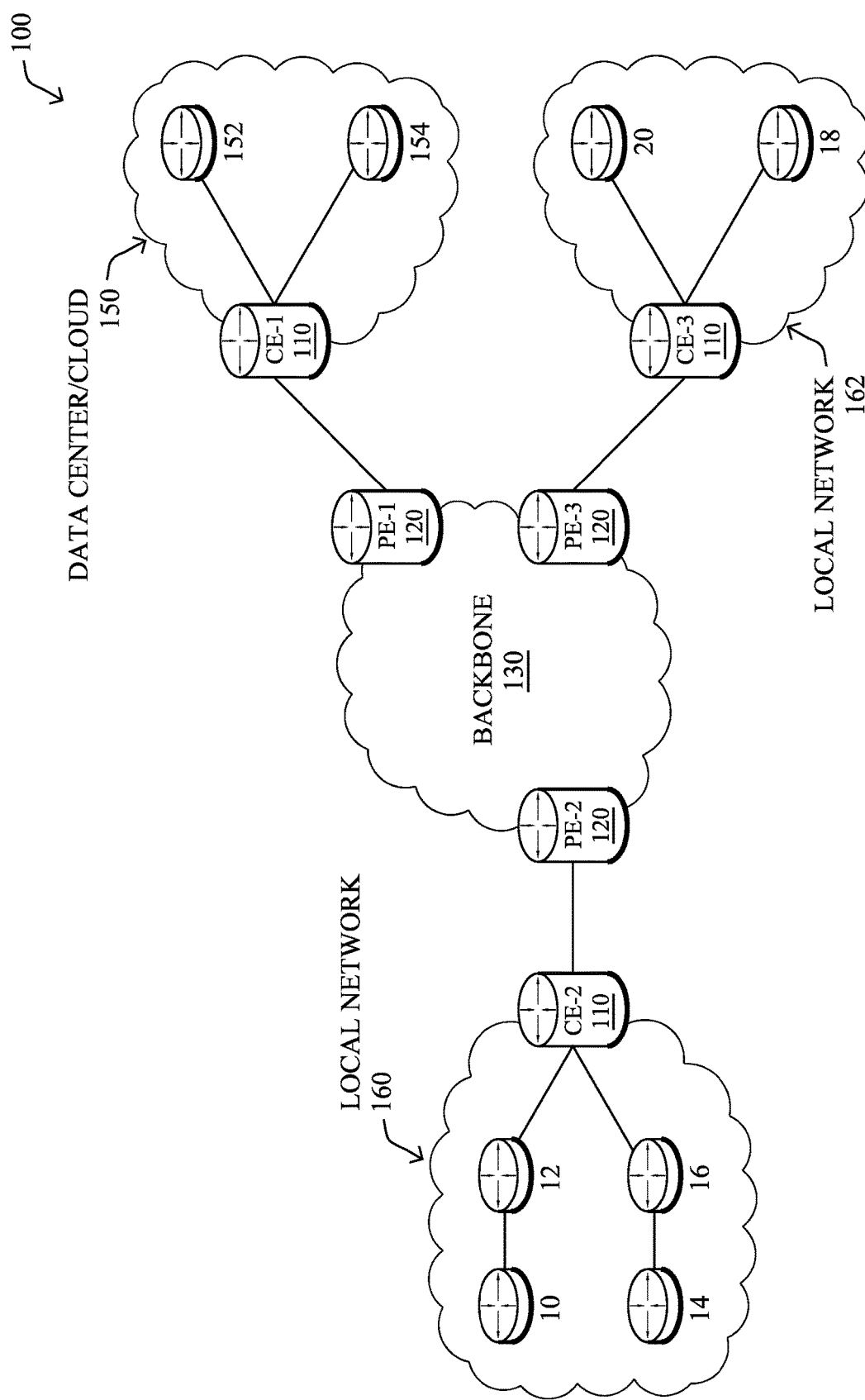

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
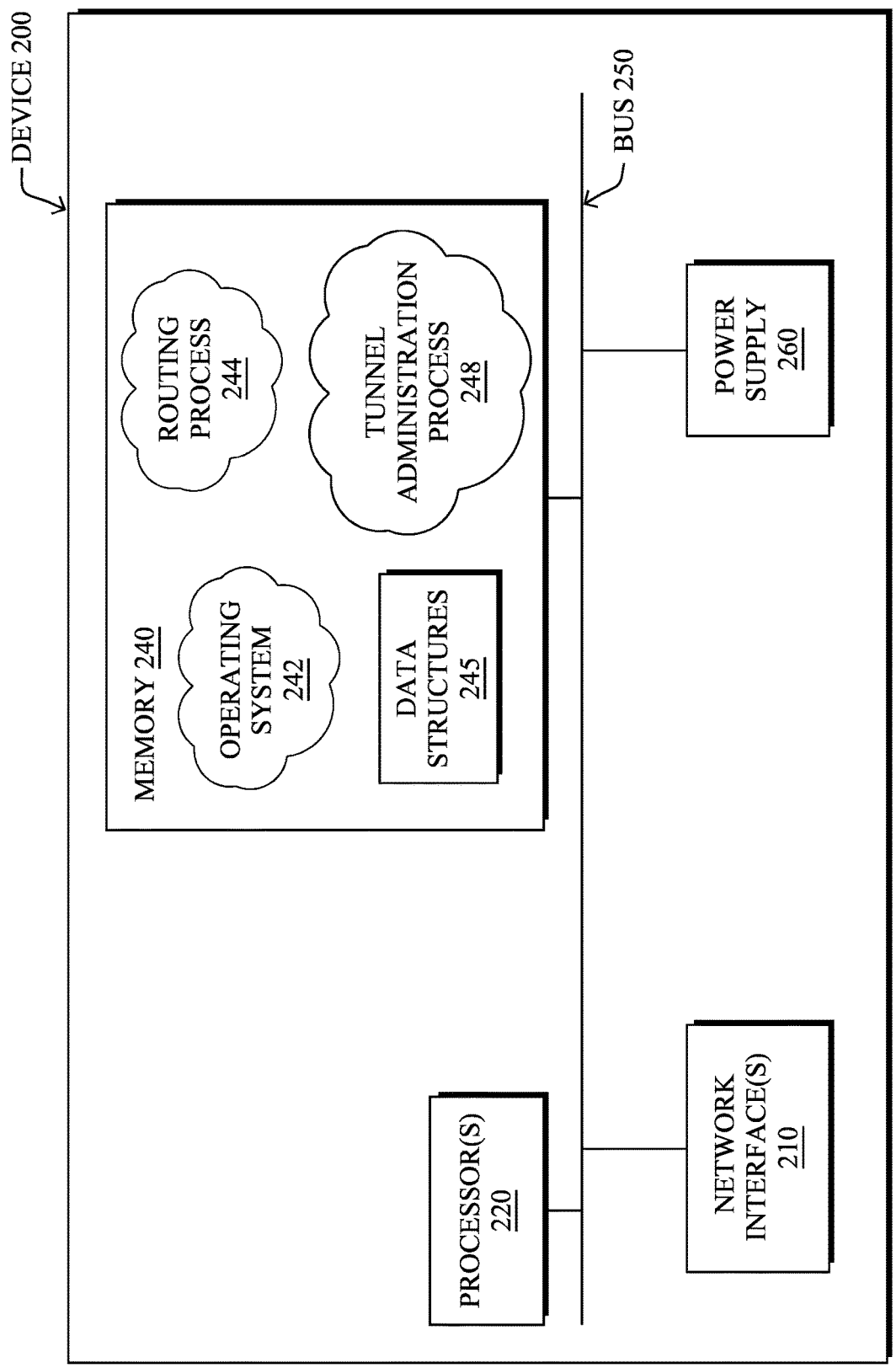
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a tunnel administration process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or tunnel administration process 248 may also include computer executable instructions that, when executed by processor(s) 220, cause device 200 to perform the techniques described herein. To do so, in some embodiments, routing process 244 and/or tunnel administration process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or tunnel administration process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or tunnel administration process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
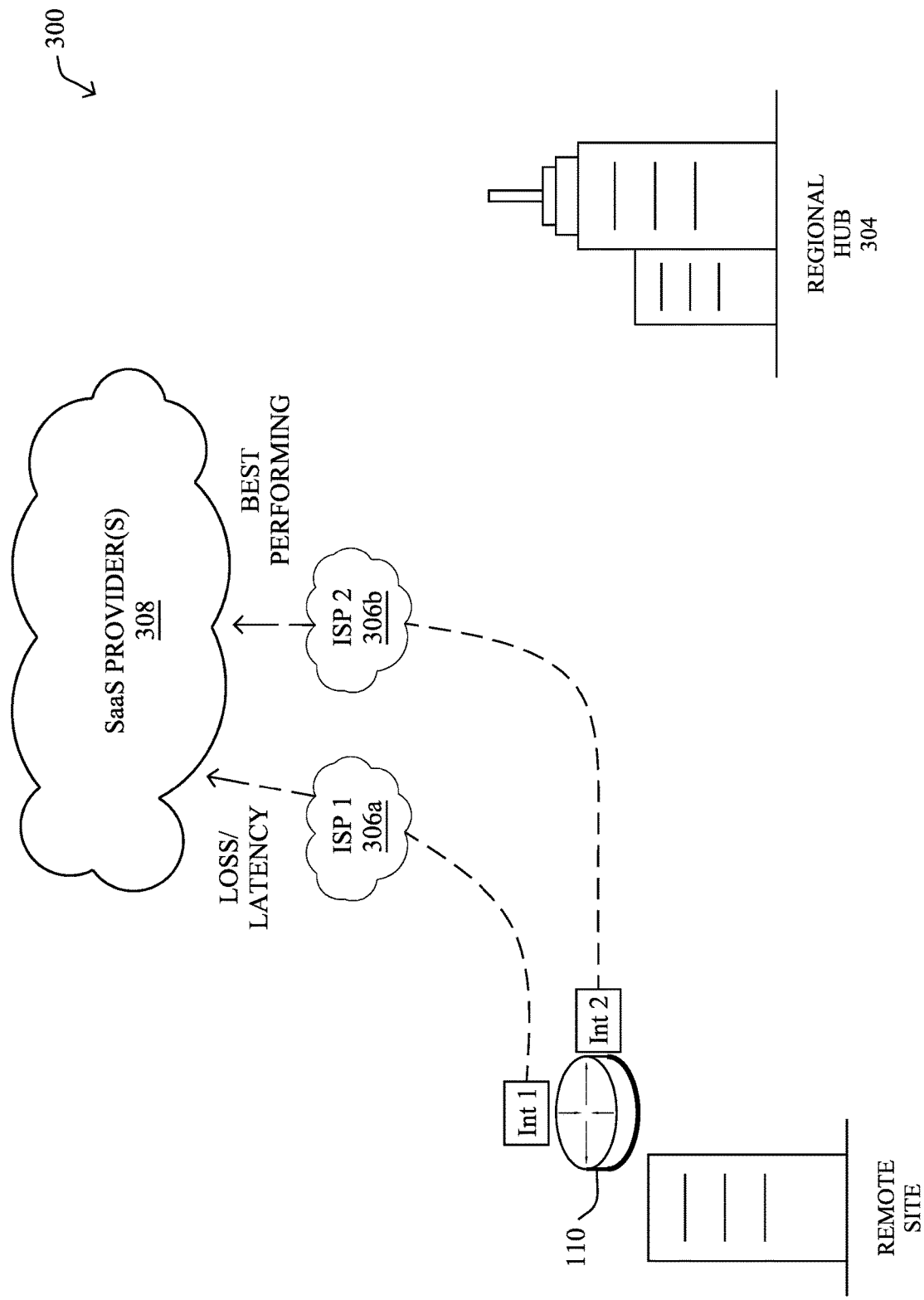
FIGS. 3A-3B illustrate example network deployments.
Figure 3B:
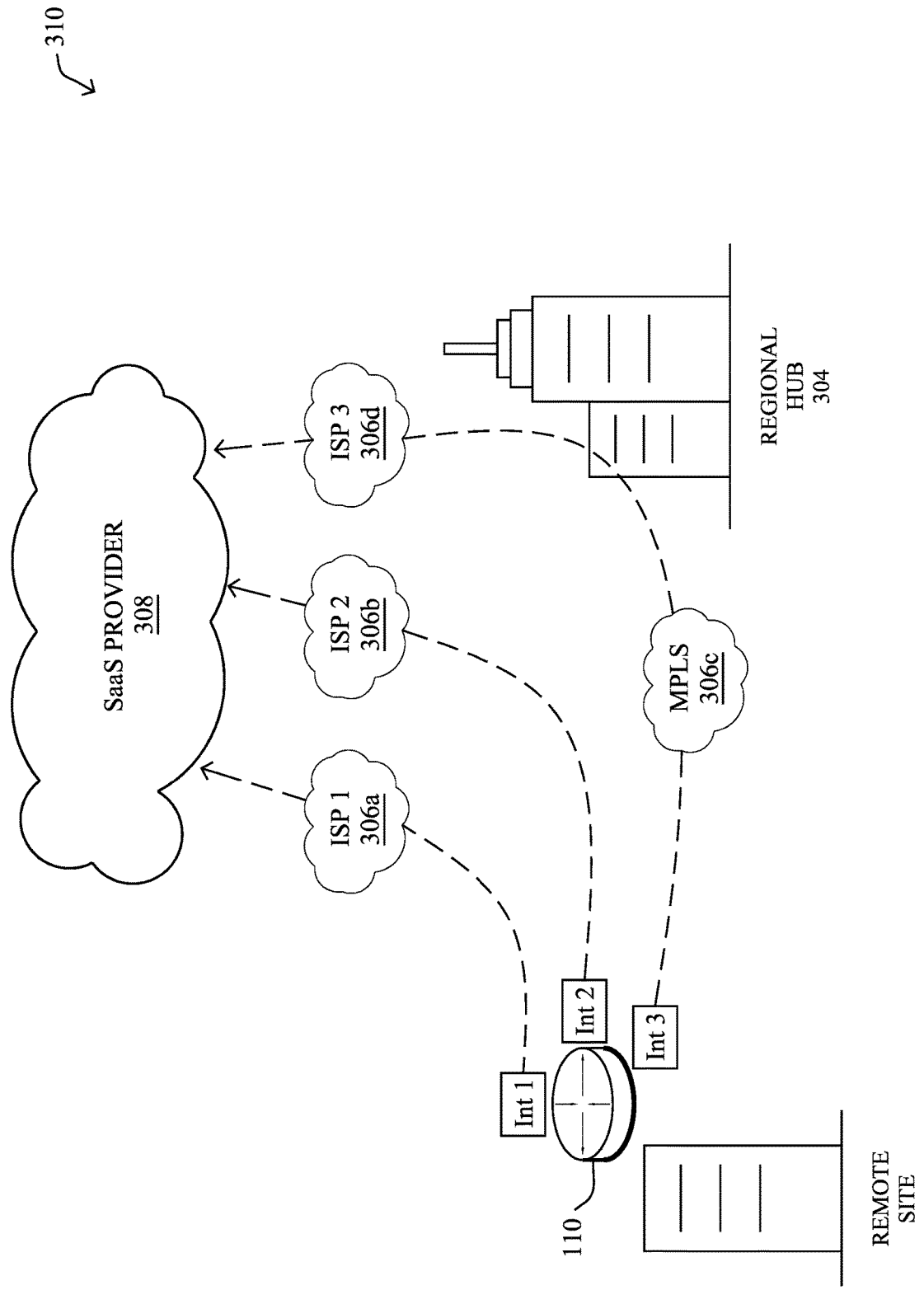

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
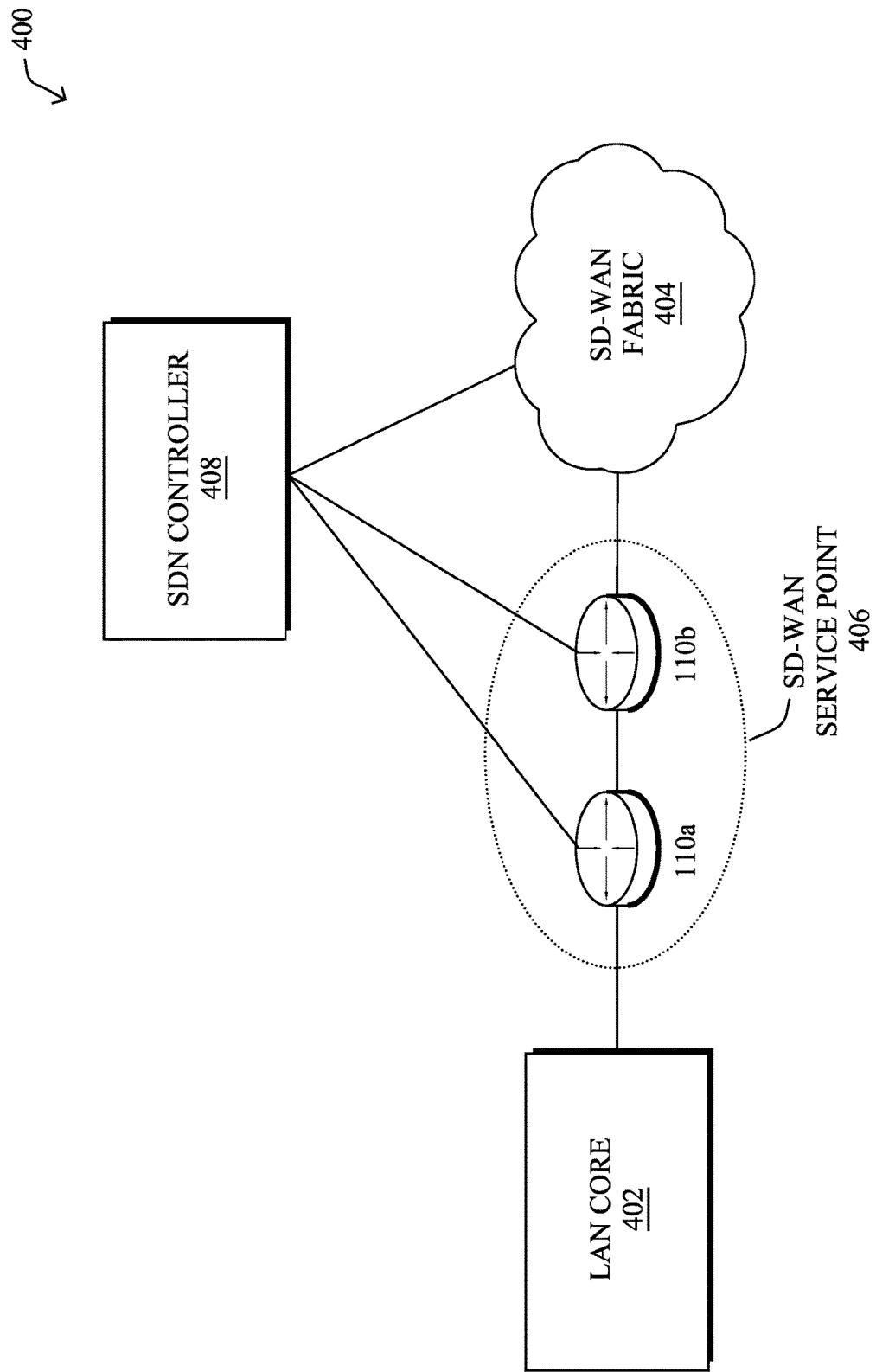
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HypefText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.
Routing is still entirely reactive: decisions are made using probes that reflect the status of a path at a given time, in contrast with the notion of an informed decision.
SLA failures are very common in the Internet and a good proportion of them could be avoided (e.g., using an alternate path), if predicted in advance.

Figure 4B:
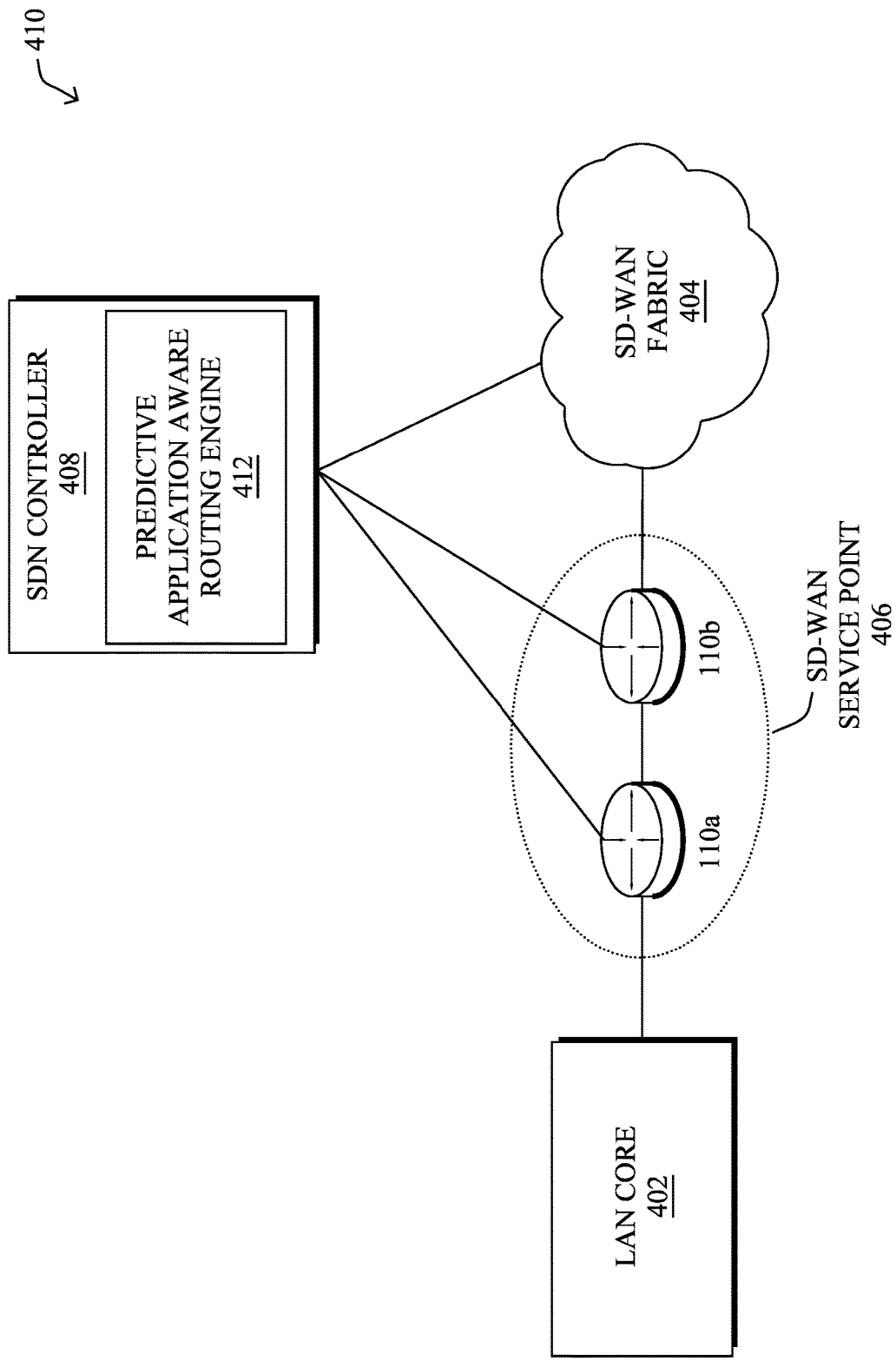

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 244 and/or tunnel administration process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As noted above, the issue of determining the most optimal SD-WAN topology is an ongoing challenge to network operators. In the absence of data and in a world where destinations keep moving due to the fast-growing adoption of SaaS applications, many operators now employ one of the following topologies:

A hub & spoke topology where all on-net destinations are sent from an edge to a hub and some off-net (outside of the enterprise) are reached either via the hub, also referred to as the gateway, or directly using the Internet, via a Direct Internet Access (DIA) connection.
A full-mesh topology where all sites are interconnected via a mesh of IpSec or GRE tunnels for all on-net destinations, or directly using the DIA.
In some cases, a per-region, full-mesh topology where all sites in a given region are meshed with SD-WAN tunnels.

There are pros and cons with each of the above approaches, mostly trading off routing optimality versus complexity/scale. Indeed, since since the number of tunnels scales with the square of the number of sites, some network operators have faced a number of issues. For instance, it has been observed that some network operators have 10,000 or more sites, leading to potentially hundreds of millions of tunnels, which would not scale.

Furthermore, one of the key challenges consists in determining the most optimal "exit" to the Internet. This is especially important for all of the applications that are highly sensitive to delay, loss, and jitter, such as WebEx, Microsoft Sharepoint and Teams, and the like. As of today, the only option is to compare the best path (via the DIA or the gateway) by probing the paths. Unfortunately, in common circumstances, none of those paths may satisfy the stringent requirements of such applications.

—On-the-Fly SD-WAN Tunnel Creation for Application-Driven Routing—

The techniques introduced herein allow for the dynamic adjustment of the topology of an SDN network (e.g., an SD-WAN) using a central engine capable of creating tunnels on-the-fly so as to redirect traffic from an edge site, to improve the overall application experience. In some aspects, the techniques herein may be applied, or not applied, on a per-application basis. In further aspects, the techniques herein allow for the ingestion of data indicative of the application experience (e.g., user-provided ratings. SLA metrics and violations, etc.), to create new tunnels in the network. Such tunnels may also be monitored over time and potentially removed when no longer necessary so as to limit the number of tunnels in the network.

Illustratively, the techniques described herein may be performed by hardware, software, and/or firmware, such as in accordance with tunnel administration process 248, which may include computer executable instructions executed by the processor 220 (or independent processor of interfaces 210) to perform functions relating to the techniques described herein (e.g., in conjunction with routing process 244).

Specifically, according to various embodiments, a controller for a network comprising a plurality of edge routers obtains data indicative of an application experience metric for an online application having application traffic conveyed via the network. Each edge router is connected to at least one other edge router in the plurality of edge routers via a tunnel. The controller predicts, for a first edge router in the plurality of edge routers, the application experience metric that would result from the first edge router conveying its application traffic to the online application via a second edge router in the plurality of edge routers that is not currently connected to the first edge router via a tunnel, based on the data indicative of the application experience metric obtained by the controller. The controller makes a determination that the first edge router should route its application traffic to the online application via a tunnel between the first edge router and the second edge router, based on the application experience metric predicted by the controller. The controller causes, based on the determination, a tunnel to be established in the network between the first edge router and the second edge router, whereby the first edge router routes its application traffic to the online application via the second edge router.

Figure 5:
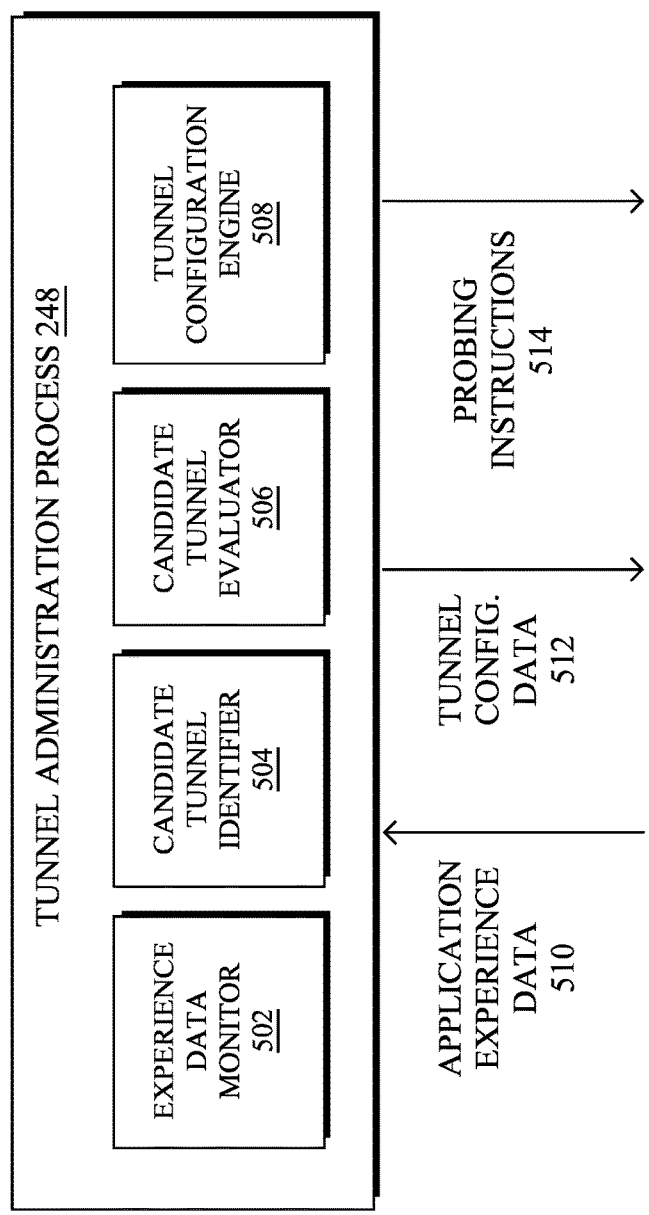
FIG. 5 illustrates an example architecture for the on-the-fly creation of network tunnels.

Operationally, FIG. 5 illustrates an example architecture for the on-the-fly creation of network tunnels, according to various embodiments. At the core of architecture 500 is tunnel administration process 248, which may be executed by a controller for a network or another device in communication therewith. For instance, tunnel administration process 248 may be executed by an SDN controller (e.g., SDN controller 408 in FIGS. 4A-4B), a particular networking device in the network (e.g., a router, etc.), etc.

As shown, tunnel administration process 248 may include any or all of the following components: an experience data monitor 502, a candidate tunnel identifier 504, a candidate tunnel evaluator 506, and/or a tunnel configuration engine 508. As would be appreciated, the functionalities of these components may be combined or omitted, as desired. In addition, these components may be implemented on a singular device or in a distributed manner, in which case the combination of executing devices can be viewed as their own singular device for purposes of executing tunnel administration process 248.

According to various embodiments, the network may initially be configured with a simplistic topology. For instance, the network may be configured, at first, with a hub & spoke topology, whereby each edge site E is connected to a Hub (Called H) and to the Internet via Direct Internet Access (DIA). Such topologies afford a minimized set of initial tunnels, to preserve the scalability of the network.

As noted previously, SLA templates are used to specify the maximum tolerable network centric key performance indicators (KPIs) that a given application must meet in order to preserve user satisfaction with the application (e.g., in terms of delay, loss, jitter, etc.). In some embodiments, an SLA template may be customized to also indicate whether the dynamic tunnel creation mechanism introduced herein should be used for the application associated with that SLA template. In another embodiment, the SLA template may specify that the tunnel creation mechanism should only be used for traffic of a given application A, if and only if the SLA is violated for a minimum amount of traffic, a percentage of time, a specific threshold, combinations thereof, or the like. For instance, the SLA template (or another parameter) may indicate that the tunnel creation mechanism should only be used for WebEx traffic if, and only if, its SLA is violated for at least 1.000 sessions per day and exceed the SLA by at least 30%.

To this end, experience data monitor 502 may obtain application experience data 510 indicative of an application experience metric regarding the particular online traffic. In some instances, as noted above, application experience data 510 may comprise SLA-related information captured by the networking devices in the network. For instance, application experience data 510 may include the network-centric KPI along a given path for a given eligible application (e.g., average delay, loss, jitter from edge $E_1$ to hub, from edge $E_1$ to SaaS via DIA, etc.).

In further embodiments, application experience data 510 may include information provided by the users of the online application itself. For instance, application experience data 510 may include feedback from the application that can be ingested, for instance, via an application programming interface (API) with the online application. Such feedback may take the form of a rating (e.g., from 0-5 stars, 0-10, etc.), label (e.g., 'good.' 'degraded.' 'bad,' 'no opinion,' etc.), or the like.

Regardless of the specific type(s) of application experience data 510 obtained by experience data monitor 502, a key function of experience data monitor 502 is to determine when the application experience is unacceptable and initiate correction, such as through the establishment of a new tunnel in the network. For instance, in the case of application experience data 510 comprising user-supplied feedback about the particular application, certain policy threshold could also be configured via experience data monitor 502 regarding this feedback, similar to the SLA example above (e.g., only initiate dynamic tunnel creation if more than 20% of the users rate their application experience as 'bad'). In other words, experience data monitor 502 may trigger the dynamic creation of a tunnel based on SLA violations, measured network KPIs, and/or user-supplied feedback regarding the application.

For instance, experience data monitor 502 may track all of the application experience metrics for the existing tunnels and DIA connections in the network in the form of a graph whereby each edge of the graph (e.g., a tunnel or DIA connection) is weighted using the application experience metrics for that edge. Experience data monitor 502 may also update the graph, as needed, such as when a new tunnel is proposed or created by the other components of tunnel administration process 248.

Figure 6:
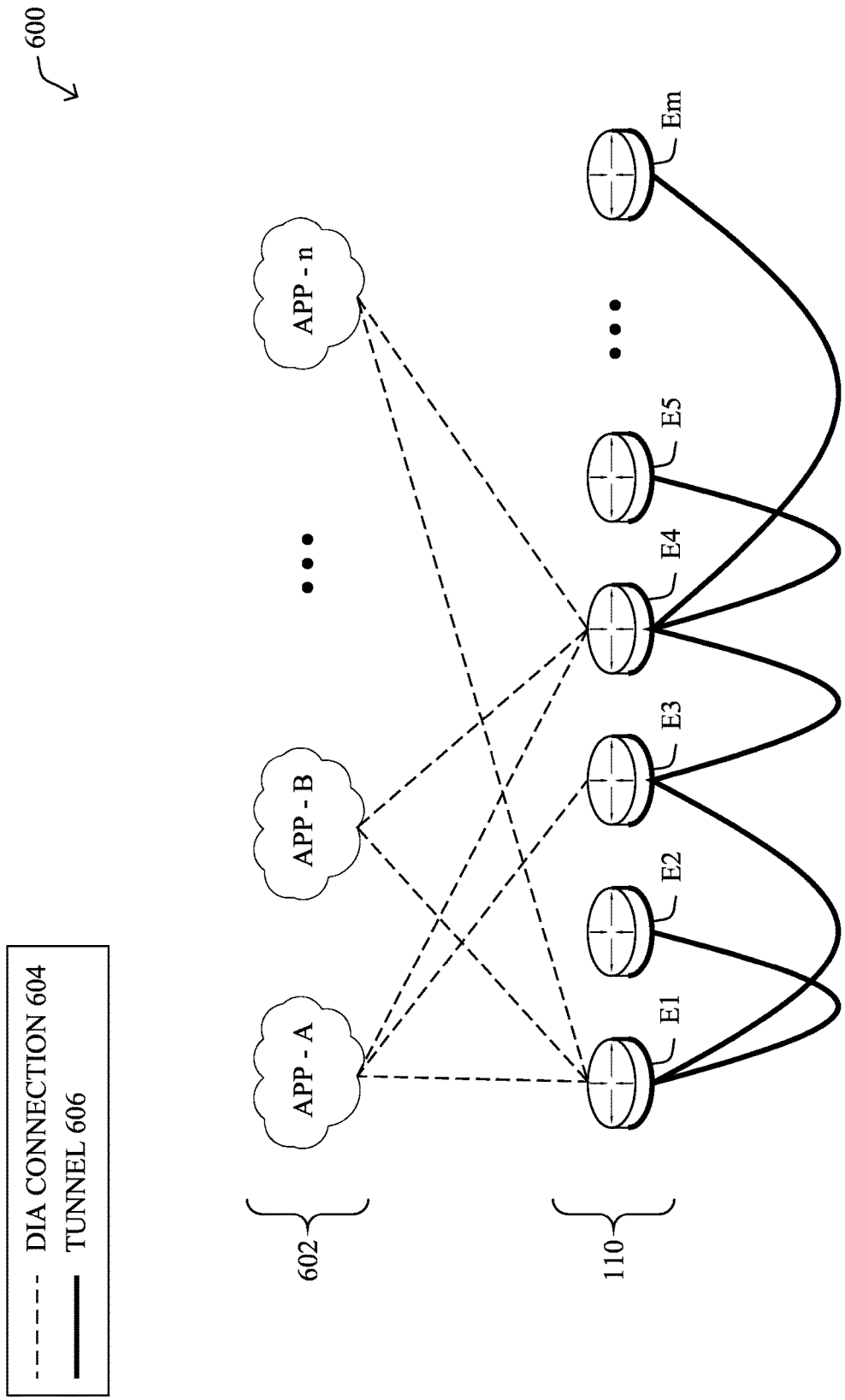
FIG. 6 illustrates an example of edge routers connecting to online applications.

To better illustrate the operation of experience data monitor 502 and tunnel administration process 248, more generally, FIG. 6 illustrates an example network 600. As shown, network 600 may comprise a plurality of online applications 602 (e.g., a first through $n^{th}$ online application) to which a plurality of edge routers 110 may connect (e.g., a first through $m^{th}$ edge router, which are denoted E1-Em). In the example shown, assume that sites/edge routers E1 and E4 have DIA connections to the various online applications 602. In addition, tunnels 606 may be created between certain pairs of edge routers 110. For instance, say E2 is to route traffic to Application A in online applications 602. To do so, it may send its traffic via a tunnel to E1, which sends the application traffic onward to Application A (e.g., a server that provides the online application).

During operation, experience data monitor 502 may obtain data indicative of the application experience, such as from the users of the application located at the site of E2 and/or traffic metrics collected along the path via which the application traffic was routed. In turn, if the monitored metrics no longer meet the conditions specified to experience data monitor 502, experience data monitor 502 may initiate exploration of alternate paths. Note that the current path from a particular router 110 to a particular online application 602 may simply be via a DIA connection to that application or via a tunnel to a hub in edge routers 110.

Another potential component of tunnel administration process 248 in FIG. 5 is candidate tunnel identifier 504, which is responsible for finding the best candidate tunnels to create for various applications, and computing the expected experience on them. In one embodiment, candidate tunnel identifier 504 may do so as follows:

For each site/edge router $E_i$ where the specified user experience conditions are not met for an application A, consider all sites $E_j$ where i< >j and the respective user satisfaction for the same application A using any of the current path from that site. Indeed, a site $E_j$ may have multiple paths, via the hub or via DIA, for the application A.

For each pair ($E_i$-$E_j$), estimate the potential performance for application A (e.g., its application experience metrics), should a tunnel $E_i$-$E_j$ exist and the traffic be redirected to it and the best path available from the site $E_j$. For example, should an SLA template be used, candidate tunnel evaluator 506 may compute the sum of the delay between $E_i$ and $E_j$ and then from $E_j$ to the destination.

Since no tunnel exists at this point, one strategy for candidate tunnel identifier 504 consists in using an estimate for the KPI using existing tunnels from other customers between the same pair of cities and same Internet Service Provider (ISP). If there is no such tunnel, candidate tunnel identifier 504 may create a shadow tunnel from $E_1$ to $E_j$ that does not carry (yet) any traffic, by issuing tunnel configuration data 512 to the affected edge routers. Such a shadow tunnel may simply be used to assess the network performance along this path. Note that one strategy may consist in setting up such shadow tunnels between all pairs of edge sites $E_1$, then shutting down those tunnels and keep recording the performance along those paths should a tunnel be needed at some point (e.g., multiple strategies may be used to keep the $99^{th}$ percentile values, the entire Probability Density (PDF) functions, etc.).

In some embodiments, to estimate the end-to-end performance from $E_i$ to the destination going through $E_j$, probes for $E_1$ to $E_j$, probes for $E_j$ to the destination can be combined. For instance, candidate tunnel identifier 504 may issue probing instructions 514, either directly or indirectly, to the affected edge routers, to probe the potential path segments. Indeed, for a given KPI measured on both segments, consider the empirical probability distributions P1 and P2 of the values observed on the first segment (resp. on the second segment). The probability distribution for the end to end KPI can be estimated by the convolution of P1 and P2, which corresponds to the probability distribution of the sum of the KPI over the two segments assuming that those variables are independent. In cases where the performance on $E_1$ to $E_j$ and probes for $E_j$ to the destination are not dependent, the estimate is accurate and easy to obtain with minimal network probing or infrastructure.

In another embodiment, the SD-WAN edge devices may be extended to support a new form of probe: a relayed probe (e.g., a BFD probe, an HTTP probe, etc.). For instance, a relayed BFD probe may take the general form of a BFD probe, but also specify a target destination. In turn, processing of the relayed BFD probe introduced herein may be as follows:

$E_i$ sends RelayedBFD(destination) to $E_j$ $E_j$ sends probes to the destination $E_j$ sends a response to $E_1$ that considers the performance to the destination. For instance, for the latency KPI, the total average latency is reported.

These probes require a minimal amount of cooperation between the devices and allows tunnel administration process 248 to derive better performance estimate when there are statistical dependencies between the performance of different paths.

The results of any probing may then be provided back to tunnel administration process 248 as application experience data 510 for analysis.

In another embodiment, a simple shortest path can be first triggered by candidate tunnel identifier 504 among existing tunnels to measure the best path. This provides a lower bound on the expected best path. The metric to measure the best path can be any suitable metric (total latency, loss, probability of SLA being or probability of bad application experience). Then, candidate tunnel identifier 504 may employ a greedy algorithm to find out (iteratively) a set of candidate tunnels that can be added and the expected path metric. This can be done by various heuristics, such as the estimated loss between geo-regions and ISPs based on data across any number of sites, operators, etc. In yet other embodiments, candidate tunnel identifier 504 may select candidate tunnels based on one or more specified constraints. For instance, such a constraint may specify that the amount of improvement (e.g., on the SLA violation probability) should be at-least x % or the addition of the tunnel should at least benefit by y %.

Once, candidate tunnel identifier 504 has identified a set of candidate tunnels, candidate tunnel evaluator 506 may determine whether a new tunnel Ei-Ej should be triggered, should the application experience metric for the application be significantly improved. For instance, assume that the tunnel Ei-Ej is predicted to offer a considerable increase in the path performance versus other candidate tunnels and/or the current path for the application traffic. In such a case, candidate tunnel evaluator 506 may select this tunnel as offering the best performance to the online application.

According to various embodiments, tunnel administration process 248 may also include tunnel configuration engine 508, which is responsible for establishing any new tunnels specified by candidate tunnel evaluator 506. To this end, tunnel configuration engine 508 may issue tunnel configuration data 512, either to the SDN controller or to the edge routers themselves, if tunnel administration process 248 is hosted by the SDN controller, to create the tunnel specified by candidate tunnel evaluator 506. In addition, tunnel configuration engine 508 may instruct the responsible edge router to begin routing the traffic for that particular application via the newly established tunnel.

After tunnel creation, tunnel administration process 248 may also enter into an active phase whereby it monitors the SLA for the application and/or its user-supplied ratings, to confirm whether the application experience metric for the application is significantly improved for that site. In some embodiments, tunnel configuration data 512 may be sent to a network management system (NMS) that flags the new tunnel as being in a 'monitoring' phase, which may also be for a configured amount of time. After the expiration of such a monitoring phase for the newly established $E_i$-$E_j$ tunnel, if the improvements are indeed confirmed by tunnel administration process 248, tunnel configuration engine 508 may move the tunnel to a permanent state with a specific flag reporting that the tunnel was created dynamically. In another embodiment, such a tunnel may be created for a temporary period or for specific time of the day during which the SLA for application A is specifically not met, in which case the PDF should be time-based during analysis.

Another function of tunnel configuration engine 508 may also be to specifically tear down dynamic tunnels that are no longer deemed required, so as to maintain only a minimum number of tunnels in the network. This can be done by updating the information on tunnels and DIA paths with the application experience data 510 needed for making this decision. One approach may consist in tunnel configuration engine 508 assessing the probability for the SLA to be met by observing the PDF for the related KPI at specific intervals. In another embodiment, tunnel configuration engine 508 may simply remove the tunnel following by a monitoring phase that is used to determine whether the experience metric for the application significantly drops. In another embodiment, the system can keep n-number of tunnels per edge-pair for high availability. These n-number of tunnels can be the best candidate tunnels chosen according to some metric discussed above, or based on other high-availability constraints such as the constraint that the ISPs of the tunnels have to be different.

Figure 7:
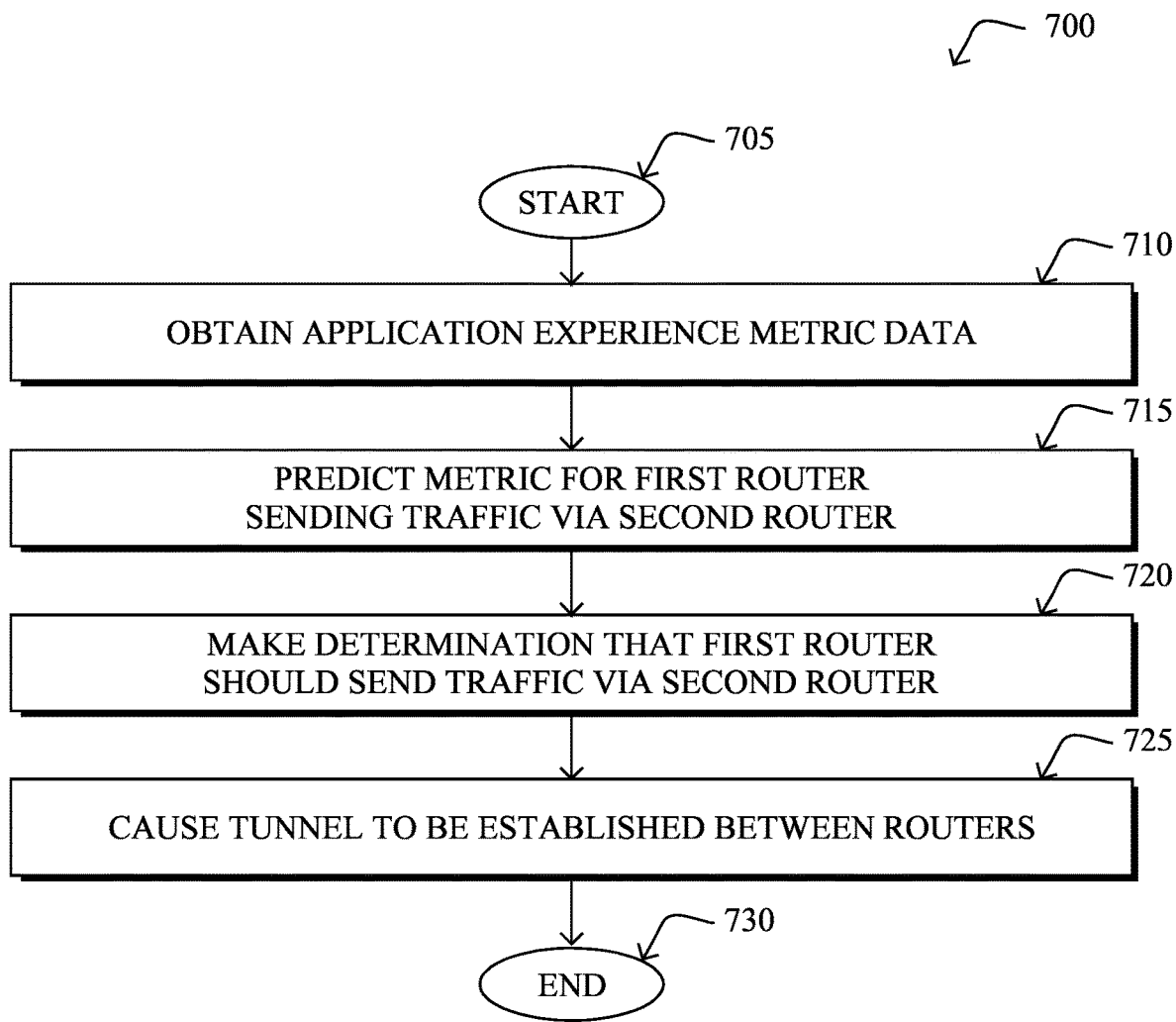
FIG. 7 illustrates an example simplified procedure for creating on-the-fly tunnels for application-driven routing.

FIG. 7 illustrates an example simplified procedure 700 for creating on-the-fly tunnels for application-driven routing, in accordance with one or more embodiments described herein. For example, a non-generic, specifically configured device (e.g., device 200), such as controller for a network (e.g., an SDN controller or other device in communication therewith), may perform procedure 700 by executing stored instructions (e.g., routing process 244/ and/or tunnel administration process 248). The procedure 700 may start at step 705, and continues to step 710, where, as described in greater detail above, the controller may obtain data indicative of an application experience metric for an online application having application traffic conveyed via the network. In general, the network may comprise a plurality of edge routers, whereby each edge router is connected to at least one other edge router in the plurality of edge routers via a tunnel. In some embodiments, the data indicative of the application experience metric may comprise SLA information (e.g., SLA violations, violation durations, etc.). In further embodiments, the data indicative of the application experience metric may comprise experience feedback from users of the application. In yet another embodiment, the controller may obtain the data in part by instructing a first edge router, either directly or indirectly, to send probes to a second edge router that then relays the probes to the online application.

At step 715, as detailed above, the controller may predict, for a first edge router in 1o the plurality of edge routers, the application experience metric that would result from the first edge router conveying its application traffic to the online application via a second edge router, based on the data obtained in step 710. In various embodiments, the first and second edge routers are not currently connected via a tunnel. For instance, in the case of relayed probes, the controller may predict whether the SLA of the application will be violated, were the first edge router to route traffic to the online application via a tunnel to the second edge router. In more complex examples, the controller may leverage machine learning, to predict a user's rating of the application, were the traffic to be routed in this manner.

At step 720, the controller may make a determination that the first edge router should route its application traffic to the online application via a tunnel between the first edge router and the second edge router, based on the application experience metric predicted by the controller, as described in greater detail above. For instance, if the predicted application experience metric for this new route is better than the current application experience metric for the current route of the application traffic, or is the best among a set of different possible routes, the controller may decide to instantiate a tunnel between the first and second edge routers and initiate rerouting of the application traffic via this tunnel. More specifically, in various embodiments, the controller may make the determination that the first edge router should route its application traffic to the online application via a tunnel between the first edge router and the second edge router, based in part on a service level agreement associated with the application traffic being violated by a threshold amount, for a threshold amount of time, or for a threshold number of sessions.

At step 725, as detailed above, the controller may cause, based on the determination, a tunnel to be established in the network between the first edge router and the second edge router. In turn, the first edge router routes its application traffic to the online application via the second edge router. In some embodiments, the first edge router may have a DIA connection to the online application, but the controller may still determine that the application traffic should be routed via the second edge router, if doing so would improve the application experience. Note also that the controller may establish the tunnel for a limited amount of time and/or remove the tunnel under certain circumstances (e.g., to maintain a minimum/threshold number of tunnels in the network, etc.). Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the on-the-fly creation of tunnels in SDNs, for purposes of application-driven routing. In some aspects, the tunnel formation may be done so as to improve the application experience (e.g., QoE) of the application from the standpoint of the user. This allows the network itself to automatically improve on the quality of the application on behalf of its users.

While there have been shown and described illustrative embodiments that provide for the on-the-fly creation of tunnels for application-driven routing, it is to be understood that various other adaptations and modifications may be made within the spirit and scope of the embodiments herein. For example, while certain embodiments are described herein with respect to using certain models for purposes of predicting application experience metrics, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
obtaining, by a controller for a network that comprises a plurality of edge routers, data indicative of an application experience metric for an online application having application traffic conveyed via the network, wherein each edge router is connected to at least one other edge router in the plurality of edge routers via a tunnel;
predicting, by the controller and for a first edge router in the plurality of edge routers, the application experience metric that would result from the first edge router conveying its application traffic to the online application via a second edge router in the plurality of edge routers that is not currently connected to the first edge router via a tunnel, based on the data indicative of the application experience metric obtained by the controller;
making, by the controller, a determination that the first edge router should route its application traffic to the online application via a tunnel between the first edge router and the second edge router, based on the application experience metric predicted by the controller; and
causing, by the controller and based on the determination, a tunnel to be established in the network between the first edge router and the second edge router, wherein the first edge router routes its application traffic to the online application via the second edge router.

2. The method as in claim 1, wherein the data indicative of an application experience metric comprises experience feedback from users of the online application.

3. The method as in claim 1, wherein the first edge router has a direct Internet access connection to the online application.

4. The method as in claim 1, wherein obtaining the data indicative of the application experience metric comprises:
instructing the first edge router to send probes to the second edge router that identify the online application, wherein the second edge router relays the to the online application.

5. The method as in claim 1, wherein the application traffic of the first edge router is routed to the online application via a direct Internet access connection between the second edge router and the online application.

6. The method as in claim 1, further comprising:
removing the tunnel between the first edge router and the second edge router, to maintain a threshold number of tunnels in the network.

7. The method as in claim 1, wherein the data indicative of the application experience metric comprises service level agreement information.

8. The method as in claim 1, wherein the controller makes the determination that the first edge router should route its application traffic to the online application via a tunnel between the first edge router and the second edge router, based in part on a service level agreement associated with the application traffic being violated by a threshold amount, for a threshold amount of time, or for a threshold number of sessions.

9. The method as in claim 1, wherein the tunnel is established between the first edge router and the second edge router for a limited amount of time.

10. The method as in claim 1, wherein the network comprises a software-defined wide area network (SD-WAN).

11. An apparatus, comprising:
one or more network interfaces;
a processor coupled to the one or more network interfaces and configured to execute one or more processes; and
a memory configured to store a process that is executable by the processor, the process when executed configured to:
obtain data indicative of an application experience metric for an online application having application traffic conveyed via a network that comprises a plurality of edge routers, wherein each edge router is connected to at least one other edge router in the plurality of edge routers via a tunnel;
predict, for a first edge router in the plurality of edge routers, the application experience metric that would result from the first edge router conveying its application traffic to the online application via a second edge router in the plurality of edge routers that is not currently connected to the first edge router via a tunnel, based on the data indicative of the application experience metric obtained by the apparatus;
make a determination that the first edge router should route its application traffic to the online application via a tunnel between the first edge router and the second edge router, based on the application experience metric predicted by the apparatus; and
cause, based on the determination, a tunnel to be established in the network between the first edge router and the second edge router, wherein the first edge router routes its application traffic to the online application via the second edge router.

12. The apparatus as in claim 11, wherein the data indicative of an application experience metric comprises experience feedback from users of the online application.

13. The apparatus as in claim 11, wherein the first edge router has a direct Internet access connection to the online application.

14. The apparatus as in claim 11, wherein the apparatus obtains the data indicative of the application experience metric by:
instructing the first edge router to send probes to the second edge router that identify the online application, wherein the second edge router relays the probes to the online application.

15. The apparatus as in claim 11, wherein the application traffic of the first edge router is routed to the online application via a direct Internet access connection between the second edge router and the online application.

16. The apparatus as in claim 11, wherein the process when executed is further configured to:
remove the tunnel between the first edge router and the second edge router, to maintain a threshold number of tunnels in the network.

17. The apparatus as in claim 11, wherein the data indicative of the application experience metric comprises service level agreement information.

18. The apparatus as in claim 11, wherein the apparatus makes the determination that the first edge router should route its application traffic to the online application via a tunnel between the first edge router and the second edge router, based in part on a service level agreement associated with the application traffic being violated by a threshold amount, for a threshold amount of time, or for a threshold number of sessions.

19. The apparatus as in claim 11, wherein the tunnel is established between the first edge router and the second edge router for a limited amount of time.

20. A tangible, non-transitory, computer-readable medium storing program instructions that cause a controller for a network comprising a plurality of edge routers to execute a process comprising:

obtaining, by the controller, data indicative of an application experience metric for an online application having application traffic conveyed via the network, wherein each edge router is connected to at least one other edge router in the plurality of edge routers via a tunnel;

predicting, by the controller and for a first edge router in the plurality of edge routers, the application experience metric that would result from the first edge router conveying its application traffic to the online application via a second edge router in the plurality of edge routers that is not currently connected to the first edge router via a tunnel, based on the data indicative of the application experience metric obtained by the controller;

making, by the controller, a determination that the first edge router should route its application traffic to the online application via a tunnel between the first edge router and the second edge router, based on the application experience metric predicted by the controller; and causing, by the controller and based on the determination, a tunnel to be established in the network between the first edge router and the second edge router, wherein the first edge router routes its application traffic to the online application via the second edge router.

\* \* \* \* \*

UNITED STATES PATENT AND TRADEMARK OFFICE
CERTIFICATE OF CORRECTION

PATENT NO. : 11,477,112 B2
APPLICATION NO. : 17/196128
DATED : October 18, 2022
INVENTOR(S) : Jean-Philippe Vasseur et al.

It is certified that error appears in the above-identified patent and that said Letters Patent is hereby corrected as shown below:

In the Specification

Column 7, Line 64, please amend as shown:
(e.g., ADSL, 4G, 5G, etc.) in all cases , as well as various Column 8, Line 10, please amend as shown:
core 402 and SD-WAN fabric 404. For instance, SD-WAN Column 8, Line 18, please amend as shown:
404. For instance, SDN controller 408 may be responsible Column 8, Line 47, please amend as shown:
workloads. On the network side, SD-WAN provides a high Column 8, Line 51, please amend as shown:
Internet with supporting multiple CoS, LTE, satellite links, Column 9, Line 31, please amend as shown:
QoE by sending HyperText Transfer Protocol (HTTP)

Column 10, Line 63, please amend as shown:
application experience (e.g., user-provided ratings, SLA Column 12, Line 8, please amend as shown:
violated for at least 1,000 sessions per day and exceed the Column 12, Line 19, please amend as shown:
average delay, loss, jitter from edge $E_i$ to hub, from edge $E_i$ Signed and Sealed this
Twenty-fourth Day of January, 2023

Katherine Kelly Vidal
*Director of the United States Patent and Trademark Office*

CERTIFICATE OF CORRECTION (continued)
U.S. Pat. No. 11,477,112 B2

Column 12, Line 28, please amend as shown:
label (e.g., 'good,' 'degraded,' 'bad,' 'no opinion,' etc.), or Column 13, Line 40, please amend as shown:
identifier 504 may create a shadow tunnel from $E_i$ to $E_j$ that Column 13, Line 46, please amend as shown:
sites $E_i$, then shutting down those tunnels and keep record- Column 13, Line 53, please amend as shown:
for $E_i$ to $E_j$, probes for $E_j$ to the destination can be combined.

Column 13, Line 64, please amend as shown:
independent. In cases where the performance on $E_i$ to $E_j$ and Column 14, Line 10, please amend as shown:
$E_j$ sends a response to $E_i$ that considers the performance Column 15, Line 58, please amend as shown:
for a first edge router in the plurality of edge routers, the